United States Patent Office 2,924,758
Patented Feb. 9, 1960

2,924,758

METHOD OF MAGNETIZING AN ANISOTROPIC PERMANENT MAGNET

Gerard Hugo Weber, Eindhoven, Netherlands, assignor, by mesne assignments, to North American Philips Company, Inc., New York, N.Y., a corporation of Delaware No Drawing. Application September 30, 1955
Serial No. 537,897

Claims priority, application Netherlands
October 2, 1954

4 Claims. (Cl. 317—203)

My invention relates to permanent magnets, preferably anisotropic magnets having an $_IH_C$ value of at least 800 oersteds.

According to known methods such magnets made from so-called magnetically hard materials must be magnetized in a very strong magnetic field, for example of from 10,000 to 15,000 oersteds in order to reach saturation.

In many cases it is desirable to incorporate the magnet in the demagnetized state in a device, for example a loud-speaker; since in its magnetized state parts stick to it making mounting difficult. In such cases, the magnet therefore, must be magnetized in its mounted state. The requisite high field strenth of, for example, 10,000 to 15,000 oersteds may then be very objectionable, either because said field strength cannot be generated in the unmagnetized body because the shape of the device does not permit or the manufacturer does not have magnetization apparatus capable of producing such high field strengths. Moreover modern isotropic and anistropic permanent magnets, for example Al—Ni—Co—Fe alloys require for ultimate magnetization, a considerably weaker magnet field of, about 3,000 oersteds, so that many manufacturers only possess a magnetization apparatus for this comparatively low field strength.

Secondly, larger magnets are often made up of a number of small magnets which are also secured in place in demagnetized condition for mounting purposes. In this case also necessary high field strength is also objectionable especially in view of the large surface and height of these magnets.

A principal object of the instant invention is to provide a method for manufacturing permanent magnets having an $_IH_C$ value of at least 800 oersteds which eliminates the above-noted disadvantages.

Another object of this invention is to provide magnets made by the improved process of this invention.

In accordance with this invention, a permanent magnet, preferably an anisotropic magnet, having an $_IH_C$ value of at least 800 oersteds, is practically magnetically saturated in a strong magnetic field and subsequently demagnetized at least for the major part in a weaker magnetic field which is only slightly different from the $_IH_C$ value (intrinsic coercive force) of the magnet. Since such a magnet only has a low magnetization or even no magnetization at all, the mounting difficulties of the known methods will not occur.

The magnet made in accordance with the invention has the surprising property that ultimate magnetization practically into the range of saturation is possible by means of a magnetic field amounting at most to 50% of the first-mentioned strong magnetic field, for example only to 30% thereof.

This invention is particularly useful if it is applied to magnets prepared from highly coherent sintered masses consisting essentially of hexagonal crystals of a material selected from the group consisting of $MFe_{12}O_{19}$ and $MFe_{18}O_{27}$ in which M is at least one metal selected from the group consisting of barium, strontium, and lead and calcium in an atomic fraction up to 0.4 of said metal. These materials are described in more detail in the article by Went et al, in Philips Technical Review, vol 13, No. 7, pages 194–208, January 1952.

This invention is also very useful if it is applied to magnets prepared from an Mn—Bi alloy such as is described in U.S. Patent 2,576,679.

For further explanation the following example is given.

An anisotropic permanent magnet, consisting of a highly coherent sintered mass consisting essentially of a compact mass of hexagonal crystals of $BaFe_{12}O_{19}$, which normally has a remanence $Br$ of 3500 gausses and an $_IH_C$ value of 1500 oersteds, was magnetized in a magnetic field of 10,000 oersteds and subsequently demagnetized in a reversed field of 1500 oersteds. A high frequency field may also be employed. Upon remagnetization in the same manner, it was found that the range of saturation had again been reached by using a magnetic field of 3000 oersteds.

The following values were used for an isotropic magnet of the same composition.

|  | Oersteds |
|---|---|
| Strong field, $_IH_C$ | 16,000 |
| Demagnetizing reverse field | 3,000 |
| Magnetizing field | 5,000 |

Therefore, while I have described my invention with reference to specific examples and applications thereof, I do not wish to be limited thereto and desire that the appended claims be construed as broadly as possible in view of the prior art.

What is claimed is:

1. A method of magnetizing an anisotropic permanent magnet having an intrinsic coercive field strength of at least 800 oersteds comprising the steps of subjecting said magnet to a magnetic field having a strength substantially exceeding 800 oersteds and sufficient to practically saturate said magnet, subjecting the resultant strongly magnetized magnet to a field of reverse polarity and having a strength not exceeding the intrinsic coercive field strength of the magnet to thereby substantially demagnetize the magnet, and subjecting said magnet to a field having a strength exceeding 800 oersteds but less than 50% of the strength of the first applied field to remagnetize said magnet to saturation.

2. The method of claim 1 in which the anisotropic permanent magnet is a highly coherent sintered mass consisting essentially of a compact mass of hexagonal crystals of a material selected from the group consisting of $MFe_{12}O_{19}$ and $MFe_{18}O_{27}$ in which M is at least one metal selected from the group consisting of barium, strontium, and lead and calcium in an atomic fraction up to 0.4 of said metal.

3. The method of claim 1 in which the anisotropic magnet is an Mn—Bi alloy.

4. A method of magnetizing a permanent magnet as claimed in claim 1 in which the final magnetizing field has a strength about 30% of the initial magnetic field strength.

References Cited in the file of this patent

UNITED STATES PATENTS

| 1,462,035 | Fondiller | July 17, 1923 |
| 2,609,411 | Reijnst et al. | Sept. 2, 1952 |
| 2,792,532 | Becker | May 14, 1957 |

FOREIGN PATENTS

| 495,950 | Italy | June 28, 1954 |